J. BEVAN.
Car Starter.

No. 107,330. Patented Sept. 13, 1870.

Witnesses:
Fred. Haynes
R. G. Rateau

John Bevan

United States Patent Office.

JOHN BEVAN, OF HUDSON, NEW YORK.

Letters Patent No. 107,330, dated September 13, 1870.

IMPROVEMENT IN CAR-STARTERS.

The Schedule referred to in these Letters Patent and making part of the same.

To all whom it may concern:

Be it known that I, JOHN BEVAN, of Hudson, in the county of Columbia and State of New York, have invented a new and useful Improvement in Car-Starters, of which the following is a full, clear, and exact description, reference being had to the accompanying drawing forming part of this specification, in which—

Figure 1:
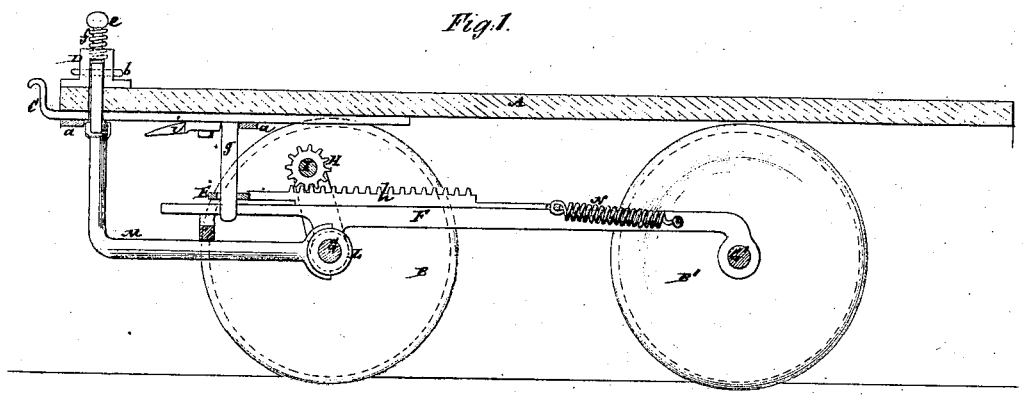
Figure 2:
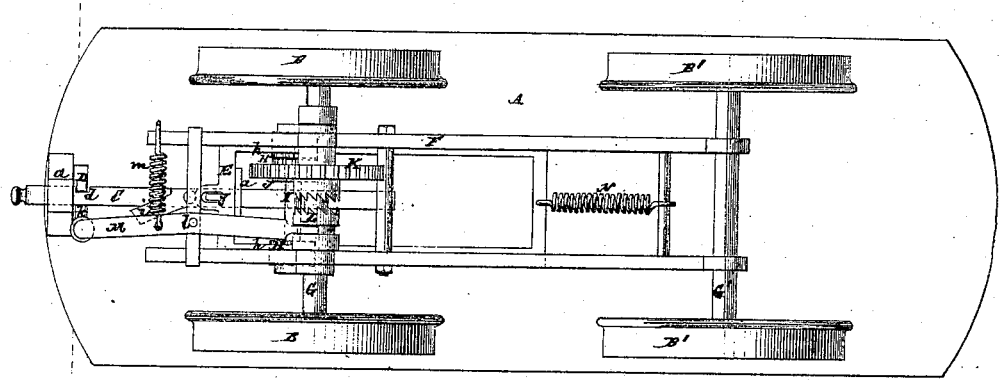

Figure 1 represents a longitudinal sectional elevation of a car bottom, together with the running-wheels of the car and its draft connections, in illustration of my improvement;

Figure 2, an inverted plan of the same; and

Figure 3:
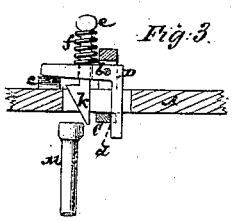

Figure 3, a transverse section, taken as indicated by the line $x\ x$ in fig. 2, of a portion of the starting mechanism.

Similar letters of reference indicate corresponding parts.

My improvement has reference to apparatus attached to horse-cars or vehicles, and arranged in connection with the draft-bar or pole, whereby in starting the car, the pull is eased or draft of the load gradually thrown upon the horses, which facilitates the starting over, or as compared with a sudden or dead pull of the full load. Various combinations and arrangements of springs have been used for this purpose, but these are very apt to break from the sudden shocks thrown upon them, or they soon grow weak and useless, and such, so far at least as making them the leading feature or main active element of the starter, I disclaim.

My invention relates to that system or combination of mechanism, in connection with a longitudinally-movable draft-bar or pole, by which the draft is eased on starting, by gearing operating to make drivers of the running-wheels of the vehicle, till the car is fairly started; and It consists in various details, or combinations of details, as herein set forth, whereby such principle of action is most effectually developed, and a car-starter, operating as described, rendered perfect or highly practicable.

Referring to the accompanying drawing—

A represents the bottom or floor of a horse-car; and

B B B' B' the fore and aft running-wheels of the car.

C is the draft-bar or attachment to the car, with which the draft-pole is connected.

This bar C is hung so as to be capable of a sliding motion in direction of the length of the car, the same traveling through guides or ways $a\ a$, secured to the car floor on its under side. Said bar stands drawn in or back prior to the starting of the car, and is held locked in such position by a stop under control of the driver or conductor.

This stop may be variously constructed, but it is here shown as consisting of a right-angled bent arm or lever, D, pivoted, as at $b$, and arranged so that, when its horizontal arm is lifted by a spring, $c$, its vertical arm or leg is made to enter a notch, $d$, in the bar C, and so hold the latter locked in its drawn-in position, but so that, when downward pressure is applied by the foot of the driver to a vertically sliding rod, $e$, acting on the horizontal leg of the stop through a spring, $f$, the vertical leg of said stop or lever D is thrown out of lock with the bar C, which is then at liberty to be drawn outward by the draft or pull of the horses on it, and, by the sliding of a horizontal frame or yoke, E, with which said bar connects by a leg, $g$, power is gradually communicated to set the car in motion, substantially as follows:

The horizontal frame or yoke E, which is made capable of longitudinally sliding on or along a fixed frame, F, carried by the axles G G' of the running-wheels, or otherwise, has arranged on either side of it a rack, $h$, which racks gear with pinions H H, fast to a cross-shaft, I, running in hangers connected with the fixed frame F.

On this cross-shaft I is another pinion, J, which gears with a spur-wheel, K, arranged to fit loose on the axle G of the front running-wheels, and made capable of a locked or driving connection with said axle, by means of a longitudinally-sliding clutch, L, fitted by a feather to such axle, so that when the spur-wheel K is thus geared with the axle by the clutch, the yoke E, on the draft-bar C, being drawn out by the pull of the horses at starting, is made to communicate the traction in a gradual or easy manner, through the aid of the gearing, to the running-wheels B B, fast on the axle G, to convert them into drivers. This action takes place till the bar C has been drawn outward to its full extent, and is arrested by means of a projection, $i$, acting as a stop on its striking the front bar-guide $a$.

The clutch L should then, or immediately before, be slid back, so as to unlock the spur-wheel K from or on the shaft G, which leaves the wheels B B free to act as mere runners under direct traction, as applied to the car through the extended and arrested draft-bar C.

To insure the timely action of the clutch L, relatively to the extreme (that is, backward and forward) positions of the bar C, in order that the wheels B B may be made either drivers or mere runners, as specified, the said clutch L should be automatically thrown in and out of gear with the wheel K. This is or may be accomplished as follows:

The vertically-sliding rod $e$, through which the stop-lever D is operated, carries at its lower end a wedge, $k$, which, on the foot of the driver being applied to depress the rod $e$, and to keep it down, for the purpose of releasing and holding released the bar C, from lock by the lever D, as hereinbefore described, serves to bear or press against a lever, M, pivoted, as at $l$, and controlling the clutch L, so that the clutch is thrown and held in lock with the wheel K, to effect the starting of the car, as already explained; but as the starting action is being completed, and the bar C being made to approach the termination of its outward stroke to establish direct traction through said bar, the release of the driver's foot from the rod $e$ causes the spring $f$ to throw the latter and its wedge $k$ up, which allows a spring, $m$, to operate the lever M, so as to move the clutch L out of gear with the wheel K.

Furthermore, the projection $i$, on the bar C, may be so shaped or set as to forcibly act upon the wedge $k$, to lift the rod $e$, as the bar C approaches its outward extension, whereby the unlocking of the spur-wheel K at the proper time is made automatic, and not left to the discretion or attention of the driver.

A spring, N, may be used to soften or ease the action of the gearing on applying the car-starter, and to aid, in connection with the momentum of the car, to draw inward the yoke E and bar C, on or as the horses are stopped or brought to a stand, so that the starting contrivance or apparatus will be placed in proper position for a fresh start of the car.

The several mechanical devices which have herein been described, to secure the operation of the starter in the manner specified, and to automically control the action of its parts, as, for instance, the relative and timely actions of the draft-bar C and clutch L, may, as a matter of course, be variously modified, without departing from the principle which characterizes the invention.

What is here claimed, and desired to be secured by Letters Patent, is—

1. The combination, with the stop for releasing the sliding draft-bar, to admit of its being drawn forward to operate the starting mechanism or gearing, of the clutch-lever M and clutch L, for operation by said stop, in timely relation to the draft-bar toward the end of its stroke or strokes, substantially as specified.

2. The combination of the projection $i$ on the draft-bar C, with the stop D or wedge $k$, of its rod, $e$, and clutch-lever M, essentially as and for the purpose or purposes herein set forth.

3. The combination, with the sliding draft-bar C, of the sliding yoke E, with its racks $h$, the pinions H H and J, the spur-wheel K, and the clutch L, on the shaft G of the running-wheels B B, for operation under control of the driver, essentially as described.

JOHN BEVAN.

Witnesses:
 FRED. HAYNES,
 HENRY PALMER.